United States Patent [19]

Woodall

[11] 4,390,491
[45] Jun. 28, 1983

[54] THREE DIMENSIONAL CONTOUR APPARATUS AND METHOD

[76] Inventor: Jerry D. Woodall, 2010 E. 51st, Apt. A, Tulsa, Okla. 74105

[21] Appl. No.: 361,593

[22] Filed: Mar. 25, 1982

[51] Int. Cl.³ .............................................. B29C 1/02
[52] U.S. Cl. ................................. 264/219; 33/23 H; 264/225; 273/176 H; 425/175; 425/DIG. 30
[58] Field of Search ............... 264/219, 220, 225, 316; 434/152; 273/1 L; 249/65; 425/175, DIG. 30; 156/58, 59

[56] References Cited

U.S. PATENT DOCUMENTS

| | | | |
|---|---|---|---|
| 2,410,888 | 11/1946 | Lucy | 264/219 |
| 3,690,673 | 9/1972 | Occhipinti | 273/176 H |
| 4,148,645 | 4/1979 | Gates | 264/219 |

Primary Examiner—James B. Lowe
Assistant Examiner—Mary A. Becker
Attorney, Agent, or Firm—Head, Johnson & Stevenson

[57] ABSTRACT

A method and means for contructing a three dimensional contour relief map, or the like, which comprises a housing having the opposite ends thereof open and having a plurality of upright side-by-side tubes disposed therein, the lower open end of the housing being in communication with a liquid reservoir, the lower end of each tube being open to the liquid through a check valve for controlling the admission of the liquid into the interior thereof, and the upper end of each tube being open, a pantograph type tracing or scribing instrument having a tracer for movement along the contours of the map being transformed into the three dimensional scale model and having an arm member movable over the open upper ends of the tubes simultaneously with the scribing of the map contour lines, a vacuum source in communication with the open upper ends of the tubes through the arm passing thereover for creating a selected pressure differential between the interior of the respective tube and the ambient pressure acting on the surface of the liquid reservoir for controlling the elevation of the liquid rising within the tube, and pin members slidably engagable with each tube for support on the surface of any liquid contained within the tube whereby the pins project upwardly from the open upper ends of the tube to provide a trace corresponding to the contour lines of the map, the projecting ends of the pins being adapted to receive a covering material thereover which may be hardened to provide a form for receiving clay or other workable material therein to provide the three dimensional scale model.

8 Claims, 7 Drawing Figures

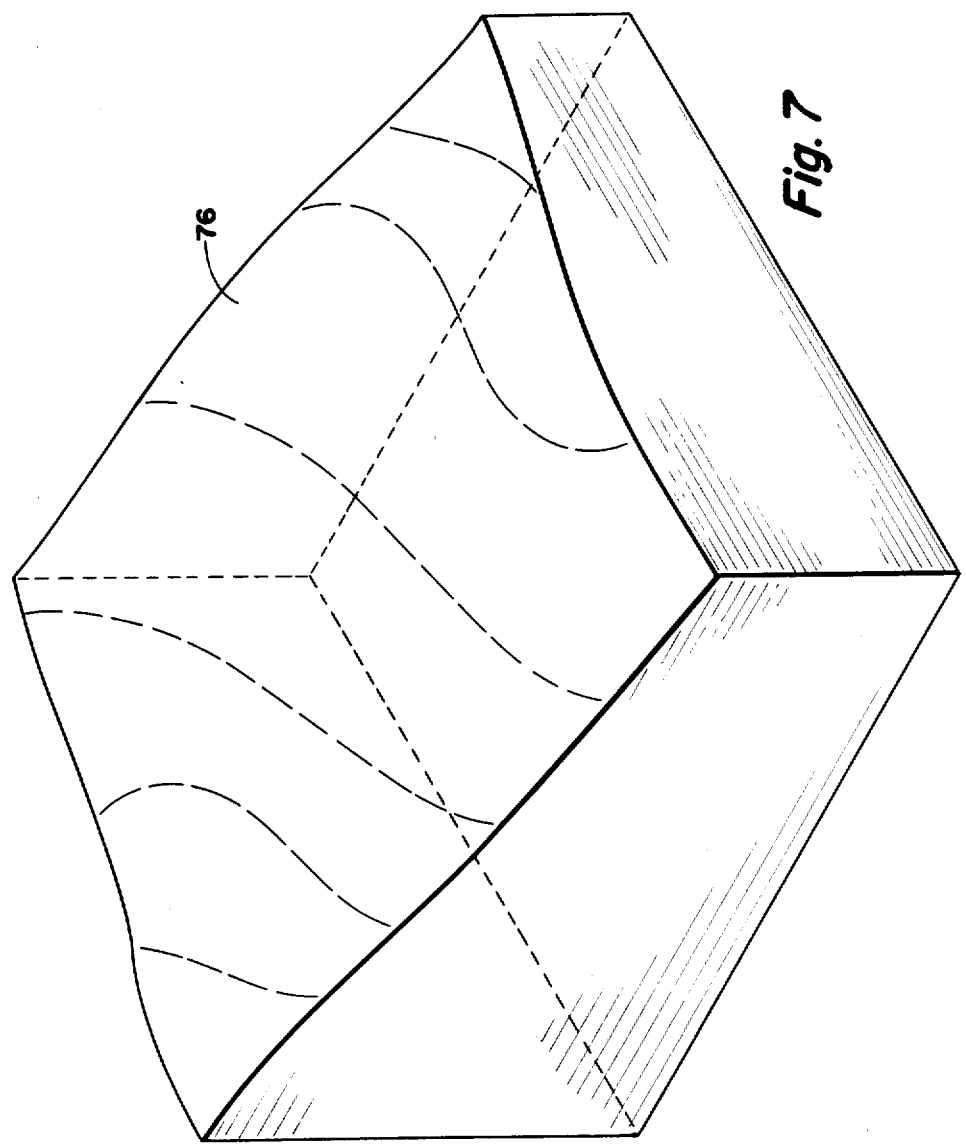

THREE DIMENSIONAL CONTOUR APPARATUS AND METHOD

BACKGROUND OF THE INVENTION

1. Field of the Invention

This invention relates to improvements in apparatus for the construction of three dimensional models and more particularly, but not by way of limitation, for the construction of relief maps directly from contour maps.

2. Description of the Prior Art

Relief maps and three dimensional models are very useful in many industries, as for example in construction operations involving highway construction, large buildings, and the like, wherein large volumes of earth must be replaced during the construction operation. For example, during the construction of a highway, scale model relief maps, and the like, are frequently utilized to provide an accurate indication of the quantity of earth displacement that will be necessary during the usual cut and fill operations. The amount of earth displacement is a critical factor in establishing bids for construction jobs of this nature, and therefore must be given very careful consideration. In oil exploration, an accurate visual view of sub-surface strata formations is needed to determine potential productive well locations. The use of different materials for different formations lends itself to model analysis in the laboratory, thereby increasing the possibility of a successful drilling operation.

At the present time, the usual scale models of terrain features or sub-surface strata formations are established by providing layers of material, such as paper board, that equal the thickness of the differential levels established by the contour lines of the topographical or sub-surface strata map relating to the territory, and overlaying the layers of material that correspond to its relative size in relation to the size of the area encompassed by a given contour line of the topographical map. This is a very time consuming and expensive procedure which adversely affects the commercial feasibility of the construction and oil exploration operation.

Devices have been developed for facilitating the construction of relief or contour maps, such as the Cadman U.S. Pat. No. 1,683,952; Johnson U.S. Pat. No. 2,988,825; Walker U.S. Pat. No. 2,999,634; Lucy Pat No. 2,410,888; French Pat. No. 1,011,841 and Russian Pat. No. 252,256. The Johnson patent discloses a vacuum framing apparatus for forming a temporary relief map, and the contour form includes a plurality of stacked layers of flat material, each cut to the required contour. These layers provide a form which supports a flexible membrane whereby the desired relief map is produced when the membrane is pulled down over the form by vacuum drawn through the bottom of the container. An electrode arrangement may be used to determine pressures in the formations to which this arrangement conforms, thus defining a more or less automatic method of forming the layers.

The Walker patent discloses a contour device in which cables connected to the underside of a flexible surface of the contour device are adjusted proportional to various measurements taken to determine contour. The cables are connected to the crossing grid points of the grid on the flexible material and are arranged to be individually extended or shortened to flex the surface of the covering material. This arrangement enables adjusting of the surface or covering material to simulate the surface of the area of interest. To make cut and fill measurements, air under pressure is introduced into the chamber beneath the membrane, and the volume of displaced air is taken as a measure of the volume of material to be moved, taking into consideration appropriate multipliers to correct for the difference in size between the model and the actual area. The Cadman reference discloses a pantograph in which rods having indicator bushings are used for the purpose of mapping or planning a formation based on available data, and the French patent shows a tracer type device which apparently facilitates the cutting of a relief model based on tracing or following the contour of the lines of a contour map. The cutting action appears to be accomplished by the outward tension on the cable as the rod is moved along the desired contour.

The Lucy patent discloses an apparatus for molding three dimensional shapes from drawings wherein a plurality of rows of pins have their adjacent ends adjusted into positions coordinated with a contour line of a drawing thereby collectively defining the contour of the line and a matrix supported by the ends of the pins conforming to the defined composite shape. The Russian patent is a cavity gauge which checks the depth and general profile or shape without using wax, or the like.

SUMMARY OF THE INVENTION

The present invention contemplates a novel apparatus for generating or constructing a relief map in a manner completely different from the foregoing and in a manner for overcoming the disadvantages and shortcomings of the present day methods. The particular levels of contour lines of a topographical map may be represented in terms of vacuum by an accurately controlable vacuum source. The vacuum source is utilized to elevate a liquid within preselected valve controlled tubes wherein the contour relating to the selected tubes is established in a manner that defines contour levels. An injection molded cube is formed by closely arranged tubes, with the bottom of the cube being immersed in a liquid having a constant surface pressure and liquid level. A pantograph type device scriber is utilized to trace the contour lines of the topographical or sub-surface map, thereby causing the liquid level within certain associated or coordinated tubes of the cube to be raised in accordance with the contour being traced. Pins are then inserted into the particular tubes having the raised liquid level therein, thus establishing contour intervals to be established by the relationship between the contour lines represented by the pins. The scale model may then be prepared by simply placing a covering of material over the projected pins, such as a plastic material that will contour closely or take on a configuration simulating the topographs of the area represented by the topographical map or sub-surface strata formations. The material may be in the form of a heat softened plastic film that will harden upon cooling and provide a relatively rigid form in which may be poured a workable substance, such as a clay or plastic, that may be worked to approximate cut and fill operations, or utilized as model tests of sub-surface petroleum bearing formations. The novel method and means for constructing three dimensional contours is simple and efficient in operation and economical and durable in construction.

BRIEF DESCRIPTION OF THE DRAWINGS

FIG. 7 is a perspective view of a completed three dimensional contour constructed with the three dimensional contour apparatus embodying the invention.

DETAILED DESCRIPTION OF THE PREFERRED EMBODIMENT

Figure 1:
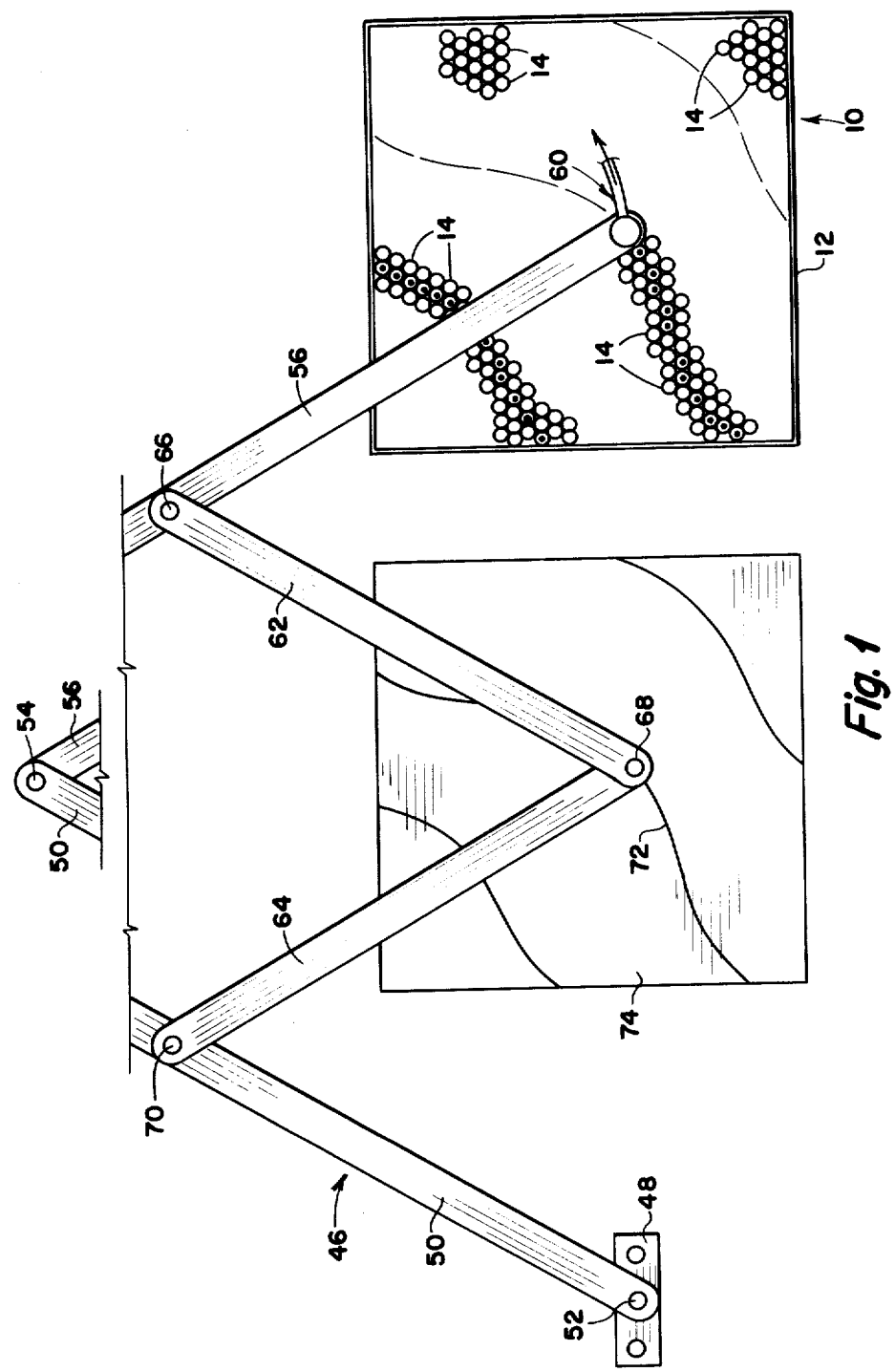
FIG. 1 is a plan view of a three dimensional contour apparatus embodying the invention and illustrated in use in combination with a topographical map and pantograph type scriber device.

Referring to the drawings in detail, reference character 10 generally indicates an apparatus for producing three dimensional contours or relief maps and comprising a housing 12 preferably of a substantially cubical configuration, but not limited thereto, having the opposite ends thereof open. A plurality of tubes 14 are fixedly disposed within the housing 12 in an upright side-by-side position and of a length corresponding to the height of the housing 12. Each tube 14 is open at the upper end thereof and the lower end of each tube 14 is provided with a port 16 therein providing communication between the interior and exterior of the tube. A ball member 18 is loosely disposed within each tube 14 for providing alternate open and closed positions for the port 16, and a transversely extending stop member 20 is provided in each tube 14 spaced slightly inboard of the port 16 for limiting the upward movement of the ball member 18 within the tube 14, as will be hereinafter set forth.

The housing 12 is adapted to be supported within a tank 22, or the like, in such a manner that the open lower end of the housing 12 and the lower ends of the tubes 14 are open to the interior of the tank 22. The tank 22 may be filled with a suitable liquid 24 to a sufficient depth that the level of the liquid rises within the lower portion of the housing 12 and surrounds the lower ends of the tubes 14, as particularly shown in FIGS. 2 and 3. As long as the ball members 18 are disposed against the respective ports 16, the liquid 24 cannot enter the tubes 14, but any time the ball member 18 is removed from the engagement with the respective port 16, the liquid 24 is free to pass through the open port 16 for entering the interior of the tube 14.

Figure 5:
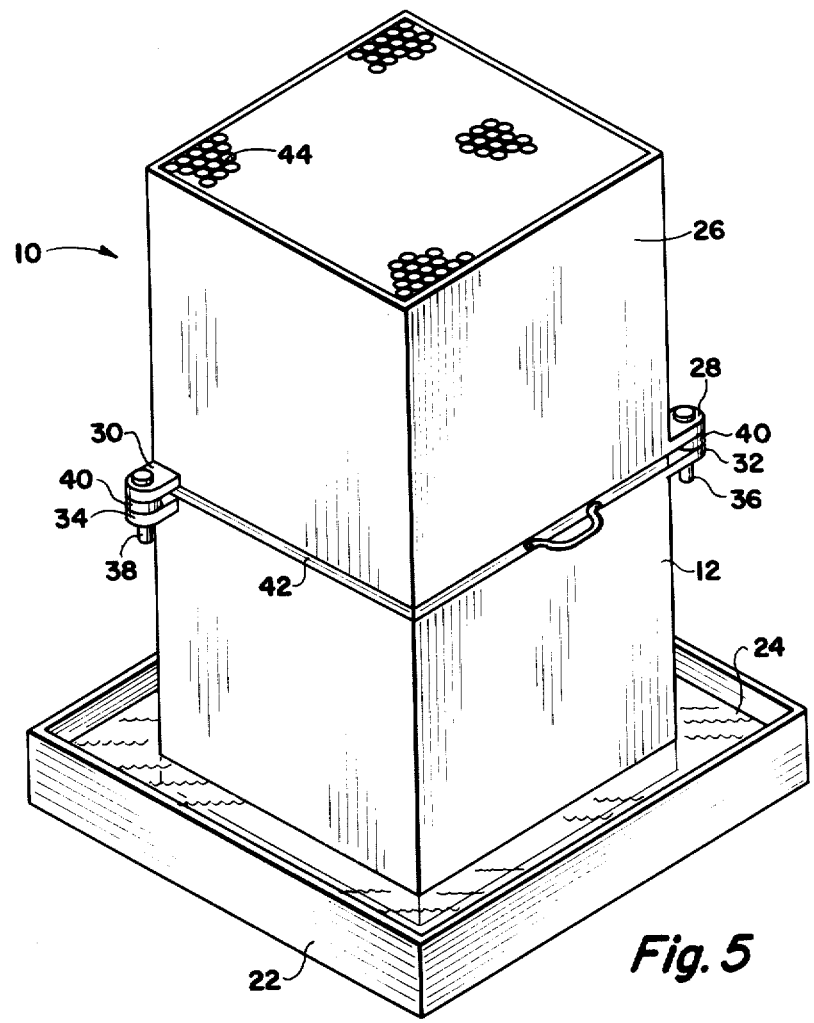
FIG. 5 is a perspective view of a three dimensional contour apparatus embodying the invention and illustrating the second step in the preparation of a three dimensional contour.

A second housing 26 generally similar in overall size and configuration to the housing 12 is adapted to be supported at the open upper end of the housing 12 as particularly shown in FIG. 5, and suitable registry means is provided for cooperation between the housings 12 and 26 for assuring a proper alignment therebetween for a purpose as will be hereinafter set forth. Whereas the registry means may be substantially any suitable construction, as shown herein a pair of diagonally opposed outwardly extending apertured flanges 28 and 30 are provided on the housing 26 in substantial alignment with a pair of complementary outwardly extending apertured flanges 32 and 34, respectively, provided on the housing 12. Pin means 36 and 38 extend between the pairs of aligned flanges 28-32 and 30-34 and each pin means is provided with a suitable centrally disposed spacer 40 for supporting the lower end of the housing 26 in slightly spaced relation with respect to the upper end of the housing 12. A plate member 42 is slidably disposed between the housings 12 and 26 and may be selectively removed and replaced as required during use of the apparatus 10.

The housing 26 is provided with a plurality of pin members 44 slidably disposed therein in an upright side-by-side position with a pin member being disposed in substantial axial alignment with each of the tube members 14 of the housing 12 when the housing 26 is placed above the housing 12. Initially, the lower ends of the pins 44 rest on the upper surface of the plate 42, and when the plate 42 is removed from the hiatus between the housings 12 and 26, the pins 44 are free to move telescopically into the aligned tube 14 therebelow.

A pantagraph type scribing apparatus generally indicated at 46 (FIG. 1) is utilized in combination with the housings 12 and 26 and comprises a fixed support means 48 having one end of a first arm member 50 pivotally secured thereto at 52. The opposite end of the arm 50 is pivotally secured at 54 to one end of a second arm member 56. The outer end of the arm 56 is provided with a port 58 (FIG. 2) open to a source of vacuum (not shown) through a suitable conduit means 60. It is preferable to interconnect the arms 50 and 56 by means of a pair of link members 62 and 64, with one end of the link 62 being pivotally secured to the arm 56 at 66 and the opposite end thereof pivotally secured to one end of the arm 64 at 68, and the opposite end of the arm 64 pivotally connected to the arm 50 at 70. A suitable scriber or tracer (not shown) is secured at the pivot point 68 for tracing along the contour lines 72 of a topographical map 74, or the like, for transmitting a corresponding movement to the outer end of the arm 56 as is well known, and for a purpose as will be hereinafter set forth.

Figure 2:
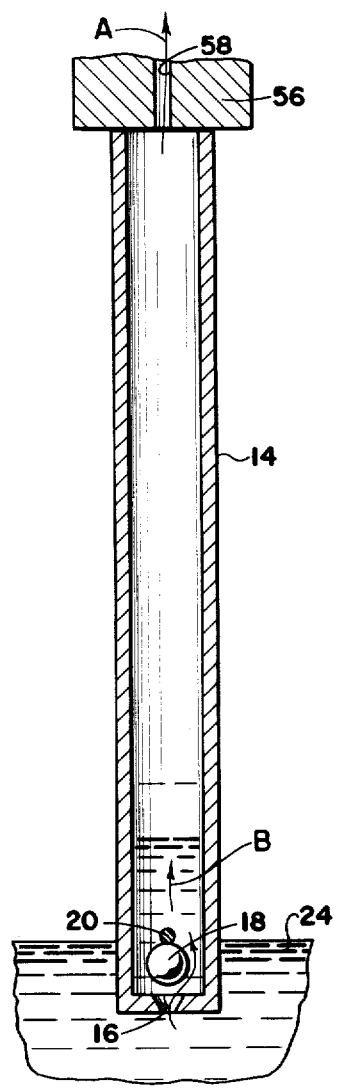
FIG. 2 is a sectional elevational view of a valve controlled vacuum tube utilized in a three dimensional contour apparatus embodying the invention and illustrating one phase in the operation of the apparatus.
Figure 3:
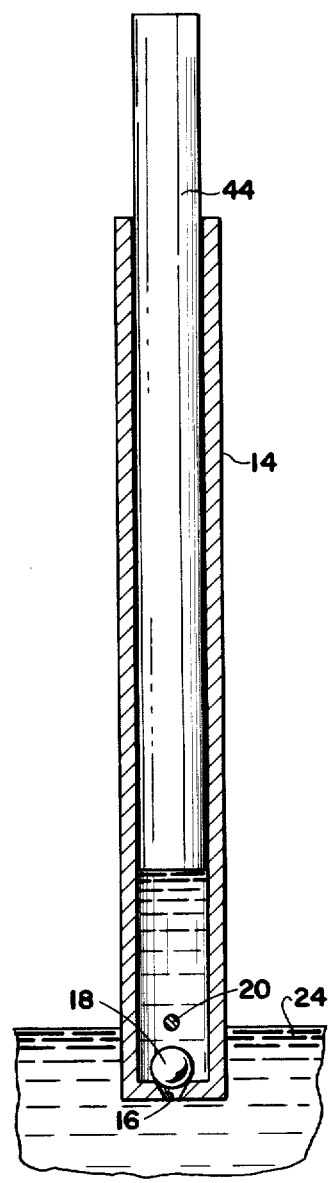
FIG. 3 is a view similar to FIG. 2 showing another phase of operation of the three dimensional contour apparatus.
Figure 4:
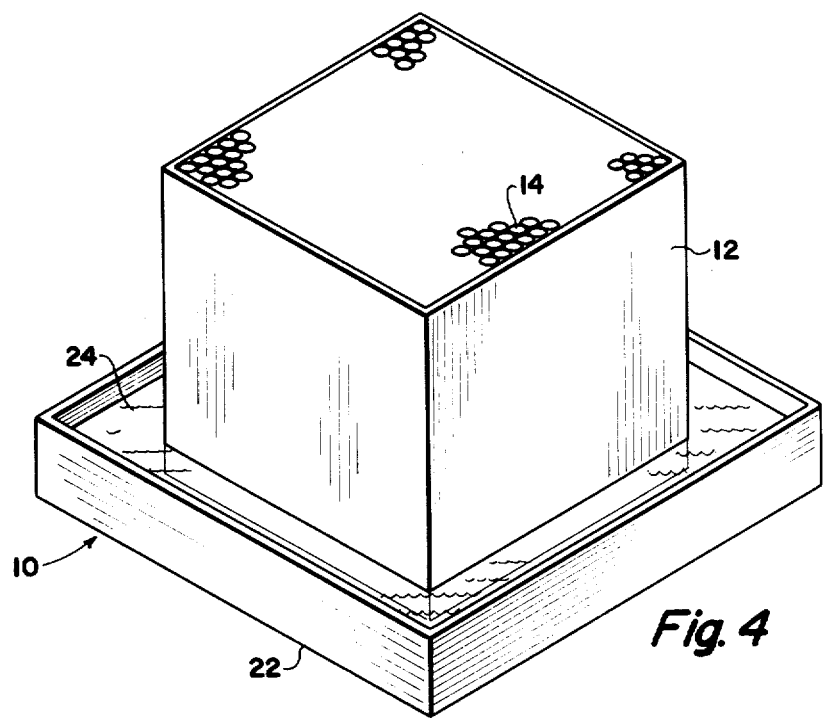
FIG. 4 is a perspective view of a three dimensional contour apparatus embodying the invention and illustrates the initial step in the preparation of the three dimensional contour.

In order to create a three dimensional relief map or contour as shown in FIG. 7, the topographical map 74 of the desired area to be transformed into a scale model may be positioned with respect to the housing 12 whereby the outer end of the arm 56 may be positioned slidably atop the open upper ends of the tube 14 within the housing 12 as particularly shown in FIG. 1. In this manner, the port 58 of the arm 56 is free to move over the upper open end of those tubes 14 lying in the path inscribed by the outer end of the arm 56 during tracing of a particular contour line 72 by the tracer at the pivot point 68. As the port 58 moves into alignment with a tube 14, as shown in FIG. 2, a vacuum is drawn within the tube 14 as indicated by the arrow A whereby the ball member 18 moves upwardly therein and away from the port 16. The stop member 20 limits the upward movement of the ball 18 to preclude a loss thereof in the upper regions of the tube 14 and as long as the ball 18 is unseated with respect to the port 16, the liquid 24 is free to enter the interior of the tube 14 as indicated by the arrows B. In order to control or determine the height to which the liquid may rise within the tube 14 subjected to the vacuum, it may be desirable to select a particular pressure differential between the vacuum applied to the interior of the tube with respect to the ambient pressure acting on the open surface of the liquid 24 contained within the tank 22. This pressure differential may be different for each contour line 72 whereby the level differentials of the fluid within the tubes 14 will correspond to the elevational differentials represented by the various contour lines 72.

Of course, when the port 58 is moved away from the communication with the interior of a tube 14, the ball 18 will fall by gravity and close the port 16, thus precluding the entrance of additional liquid into the respective tube 14 and trapping the collected liquid therein. The tubes 14 in FIG. 1 having centrally disposed markings or indications therein represent tubes which have been supplied with fluid by the passage of the port 58 thereover. These correspond to the trace of the contour line 72 traversed by the tracer at pivot point 68, and will continue along the line or pathways indicated by the broken lines within the housing 12 as shown in FIG. 1.

Figure 6:
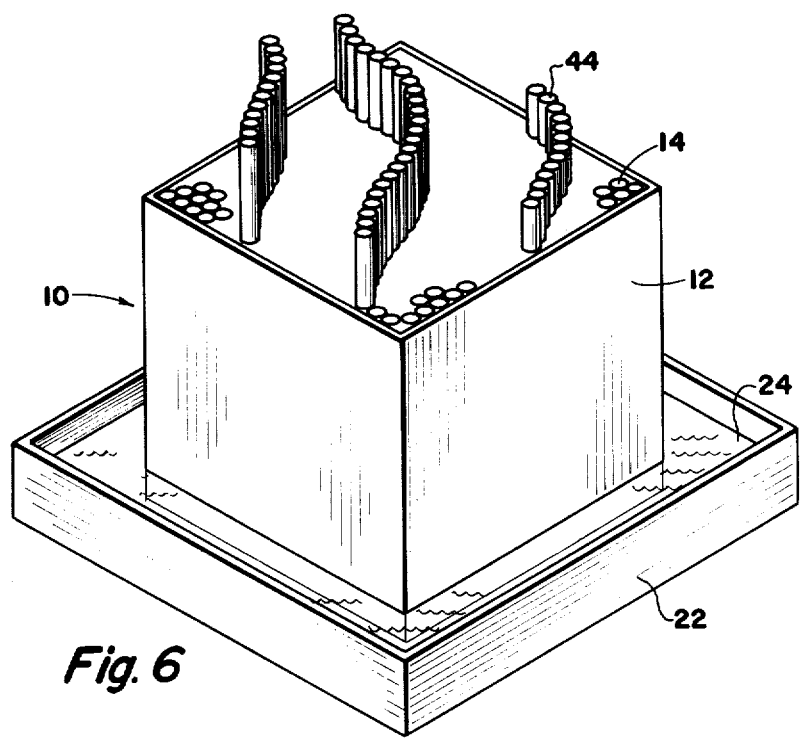
FIG. 6 is a view similar to FIG. 4 illustrating the third step in the preparation of the three dimensional contour.

When all of the desired contour lines 72 of the map 74 have been traced and the corresponding liquid accumulated within the selected tubes 14 as hereinbefore set forth, the plate 42 may be positioned above the open upper end of the housing 12 and tubes 14, and the housing 26 having the pins 44 disposed therein may be placed above the plate 42, with the proper orientation of the housing 26 with respect to the housing 12 being assured by the connection between the registry members 28-32 and 30-34 whereby each of the pins 44 is disposed in substantial axial alignment with an associated tube 14. The plate 42 may then be removed from the hiatus between the housings 12 and 26, and the pins 44 will drop by gravity into the interior of the tube 14 disposed immediately therebelow, with the lower end of each pin 44 being supported on the surface of the liquid 24 disposed within the respective tube 14, as particularly shown in FIG. 3. In the event there is no liquid within the respective tube 14, the pin 44 will fall completely through the tube and be supported by the stop member 20, and will not protrude above the open upper end of the tube. Those pins supported by the surface of the liquid within the respective tube 14 will project upwardly from the open ends of the tubes 14 as shown in FIG. 6, and will define elevational contours corresponding to the contours 72 of the map 74.

The scale model may now be prepared by simply placing a covering of material over the projecting pins 44. The covering may be any suitable material, such as a plastic material that will assume a configuration closely approximating the contours of the topographical map. For example, the material may be a heat softened plastic film which will harden upon cooling to provide a relatively rigid form into which a workable substance, such as a clay or plastic, may be poured to form the ultimate relief map or three dimensional contour 76 as shown in FIG. 7.

From the foregoing it will be apparent that the present invention provides a novel method and means for constructing scale model three dimensional contours, relief maps, or the like. A plurality of upright tube members are disposed in side-by-side relation with one end of each tube being disposed within a liquid reservoir and the opposite end of each tube being open. A check valve or control valve means is provided at the lower end of each tube for controlling the admittance of the liquid into the tube in response to pressure differentials between the surface of the liquid surrounding the tubes and the pressure within the tube. A pantograph type scribing implement having tracing means for scribing the contour lines of a topographical map, or the like, causes an arm means to move over the open upper ends of the tubes for selectively admitting a vacuum into the interior of selected tubes whereby the liquid level within the selected tubes rises corresponding to the elevation represented by the contour lines of the topographical map. Slidable pin members are introduced through the open ends of the tubes whereby the pin members are supported by the surface of any liquid present within the tube. The upper ends of the pins project beyond the upper ends of the tubes and produce a representation of the elevations of the contours of the map. A suitable covering material may be placed over the upwardly projecting ends of the pins to produce a mold for receiving moldable or workable material therein to form a three dimensional relief map, or the like, corresponding to the actual elevational representation of the topographical map.

Whereas the present invention has been described in particular relation to the drawings attached hereto, it should be understood that other and further modifications, apart from those shown or suggested herein may be made within the spirit and scope of this invention.

What is claimed is:

1. Apparatus for constructing a three dimensional scale model and comprising housing means having a plurality of upright side-by-side tube members disposed therein, the housing having the upper and lower ends thereof open and the lower end thereof disposed in open communication with a liquid reservoir, the lower end of each tube member being disposed in the liquid reservoir, check valve means provided in the lower end of each tube for controlling the admission of the liquid to the interior of the tube in response to selected pressure differentials between the interior of the tube and the ambient pressure acting on the surface of the surrounding liquid reservoir, pantograph type tracing means having means for tracing an original depiction and transmitting a corresponding tracing to the open upper ends of the tubes and admitting a reduced pressure condition to the interior of a tube traced thereby, a second housing means adapted to be supported above the first mentioned housing means, pin means disposed in the second housing in upright side-by-side arrangement in substantial axial alignment with the tubes disposed therebelow and slideably engagable with the respective tube for resting on the surface of any liquid contained therein, the upper ends of the pins projecting above the open upper ends of the tubes to define contours corresponding to the original depiction for receiving mold forming materials thereover, said mold conforming to a scale model of the original depiction.

2. Apparatus as set forth in claim 1 wherein the original depiction is a topographical map and the scale model is a three dimensional relief map corresponding to the area represented by the topographical map.

3. Apparatus as set forth in claim 1 wherein the original depiction is a sub-surface strata map and the scale model is a three dimensional relief map corresponding to the area represented by the sub-surface strata.

4. Apparatus as set forth in claim 1 wherein the second housing is spaced slightly above the first housing to provide a hiatus therebetween, plate means slidably disposed in the hiatus for supporting the lower ends of the pin members thereof, said plate means being removable for permitting the pin members to fall by gravity into the interior of the aligned tubes disposed therebelow.

5. Apparatus as set forth in claim 4 wherein registry means is provided for cooperation between the first and second housing means for assuring the alignment between the tube members and associated pin means.

6. Apparatus as set forth in claim 1 wherein the pantograph type tracing means includes a tracer means for inscribing over a portion of the original depiction and an arm member for moving over the open upper ends of the tube members simultaneously with the tracing action and in a corresponding pattern of movement.

7. Apparatus as set forth in claim 6 wherein the arm member admits vacuum into selected tube members during the passing of the arm member thereover for providing selected pressure differentials between the interior of the tubes and the ambient pressure acting on the surface of the liquid whereby a controlled quantity of liquid is admitted into the interior of the tube corresponding to the original depiction.

8. A method of constructing a three dimensional scale model corresponding to an original depiction and comprising the steps of applying selected pressure differentials between liquid columns and a liquid reservoir for controlling the elevation of the liquid in each liquid column, supporting support members from the surface of each liquid column to define a scale model representation corresponding to the original depiction, and forming a material over the support members to provide a mold for the forming of the three dimensional scale model.

* * * * *